United States Patent [19]
Tobias

[11] 3,833,988
[45] Sept. 10, 1974

[54] METHOD OF MAKING SPOOL VALVES

[76] Inventor: John D. Tobias, 233 E. Bloomfield, Royal Oak, Mich. 48073

[22] Filed: Oct. 24, 1972

[21] Appl. No.: 300,166

Related U.S. Application Data

[60] Continuation-in-part of Ser. Nos. 282,964, Aug. 23, 1972, abandoned. Continuation-in-part of Ser. No. 230,845, March 1, 1972, abandoned. Division of Ser. No. 97,140, Dec. 11, 1970, Pat. No. 3,700,004.

[52] U.S. Cl.......... 29/157.1 R, 29/445, 137/625.23
[51] Int. Cl............................................ B23p 13/00
[58] Field of Search............ 29/157.1 R, 432, 445; 137/625.23, 625.24, 625.21, 625.22, 625.2

[56] References Cited
UNITED STATES PATENTS

| | | | |
|---|---|---|---|
| 686,311 | 11/1901 | Leaycraft | 29/526 |
| 972,292 | 10/1910 | Thomas | 29/432 |
| 1,154,746 | 9/1915 | Champ | 137/625.23 |
| 2,328,606 | 8/1943 | Boldt | 137/625.23 |
| 2,595,695 | 5/1952 | Packer et al. | 29/445 |
| 3,052,013 | 9/1962 | Kane | 29/157.1 R |
| 3,299,417 | 1/1967 | Sibthorpe | 29/423 |
| 3,474,710 | 10/1969 | Stryker | 29/526 |
| 3,685,135 | 8/1972 | Letters | 29/445 |

*Primary Examiner*—Charles W. Lanham
*Assistant Examiner*—D. C. Crane
*Attorney, Agent, or Firm*—Hauke, Gifford, Patalidis & Dumont

[57] ABSTRACT

A method of making a spool valve includes forming perforations in the core and sleeve members of the valve in a single machine operation. The perforations are formed offset from and parallel to a plane which includes the axis of the core and sleeve members. The perforations may take a wide variety of shapes including round, rectangular or peripheral channels. The valve becomes functional by rotating or longitudinally adjusting the relative positions of the core and sleeve members to selectively align or block the perforations of the core member with respect to the sleeve member.

17 Claims, 29 Drawing Figures

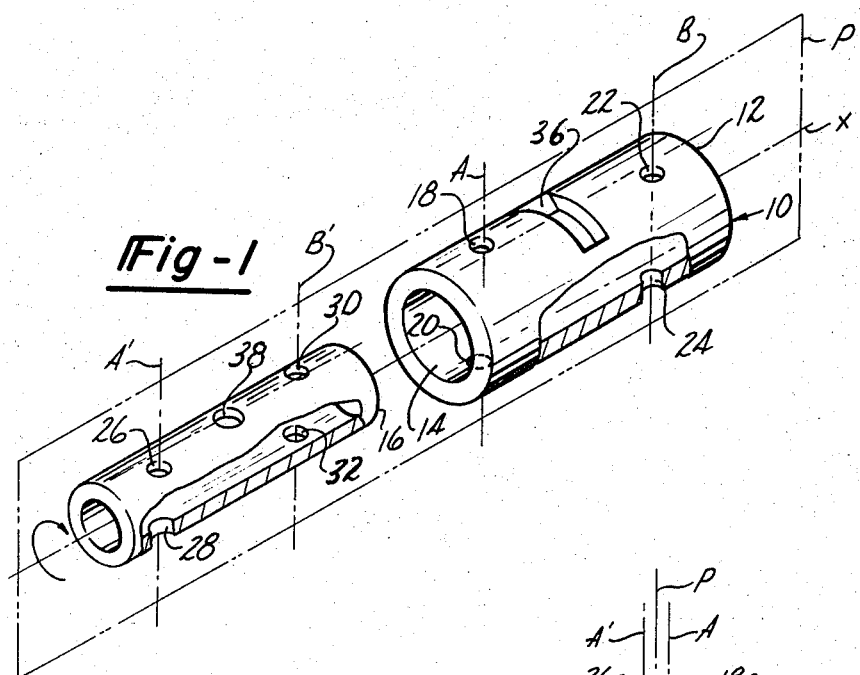
Fig-1
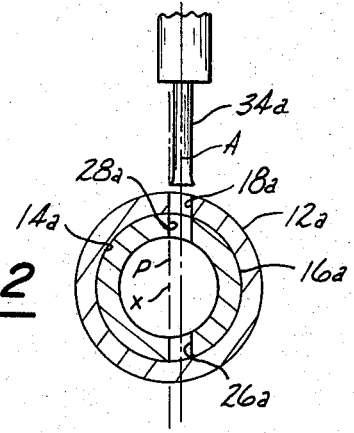
Fig-2
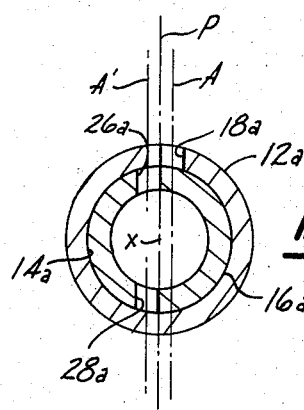
Fig-3
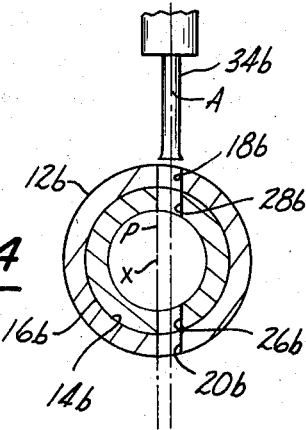
Fig-4
Fig-5

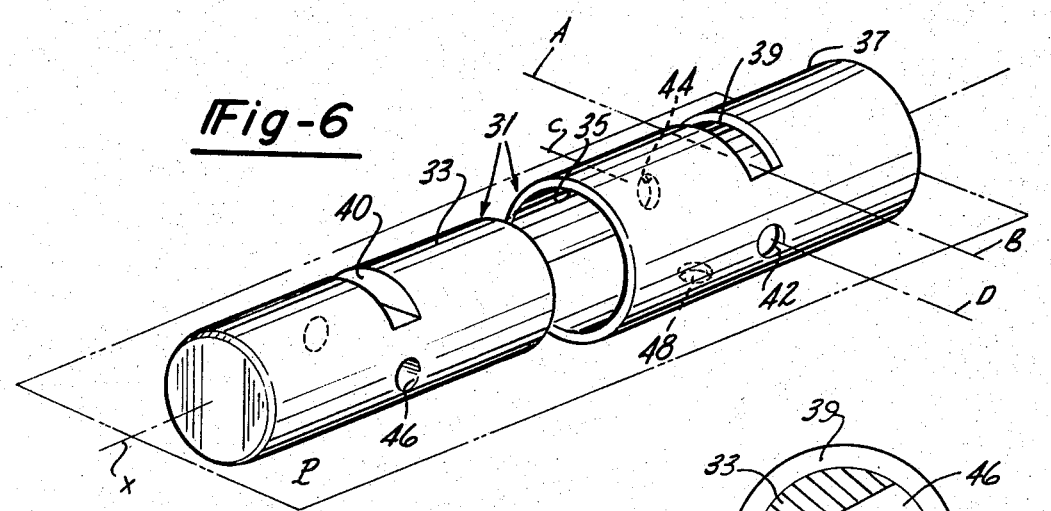
Fig-6
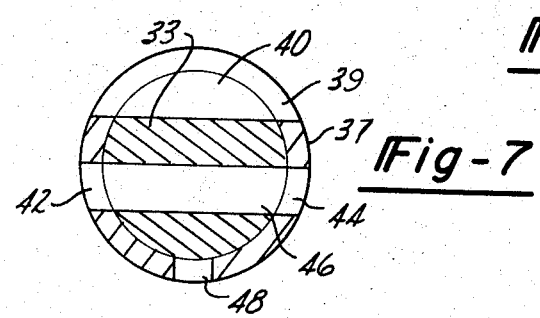
Fig-7
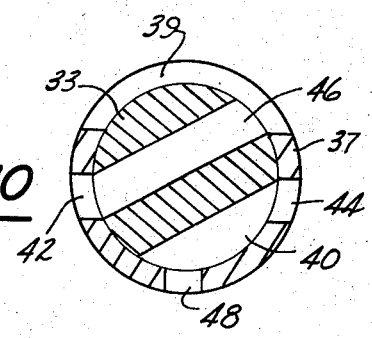
Fig-10
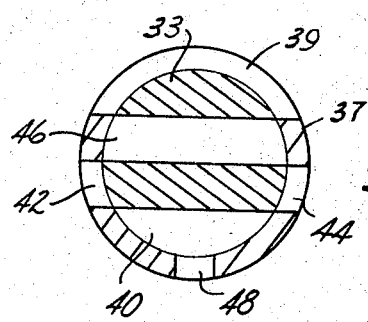
Fig-8
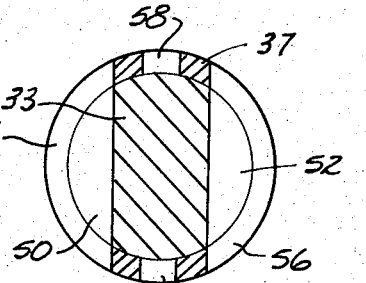
Fig-11
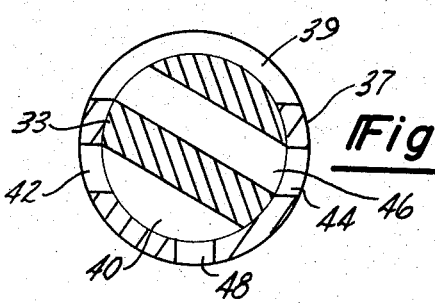
Fig-9
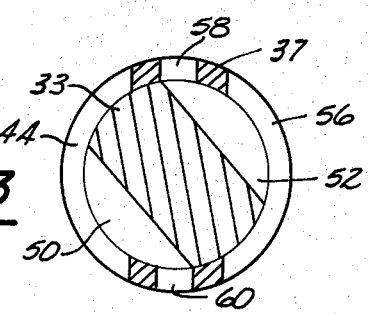
Fig-12
Fig-13

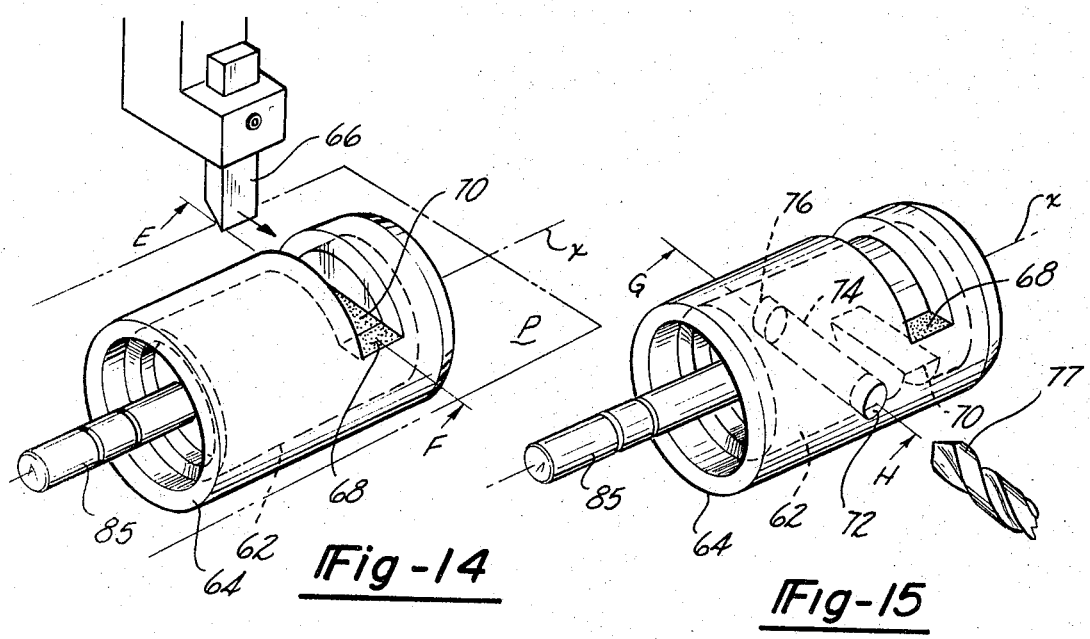
Fig-14  Fig-15
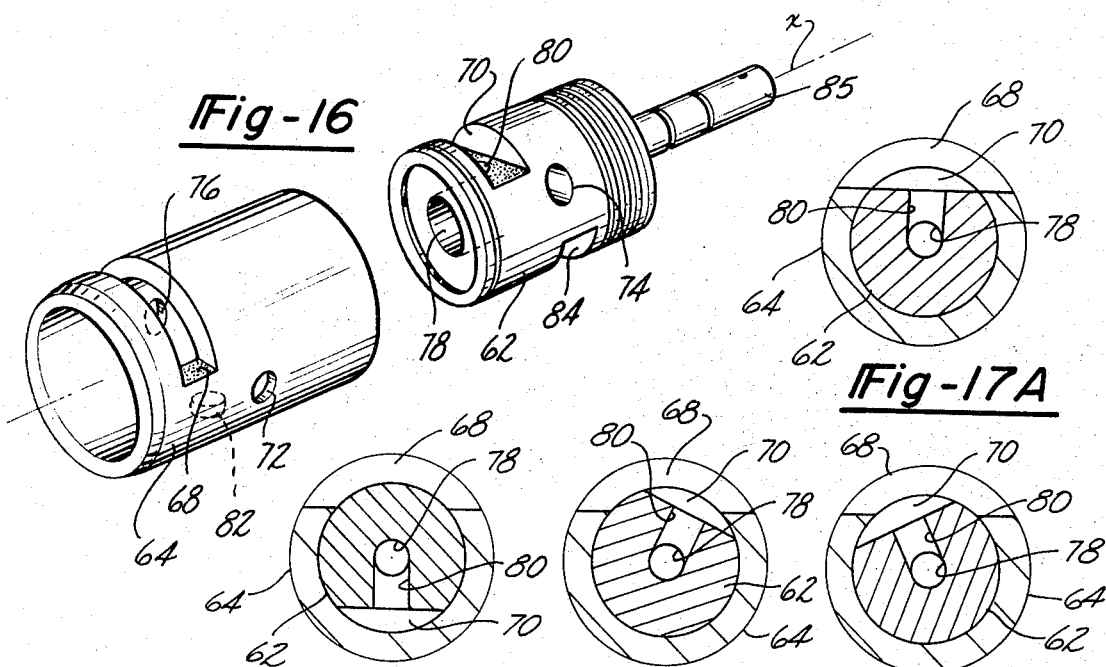
Fig-16  Fig-17A
Fig-17B  Fig-17C  Fig-17D
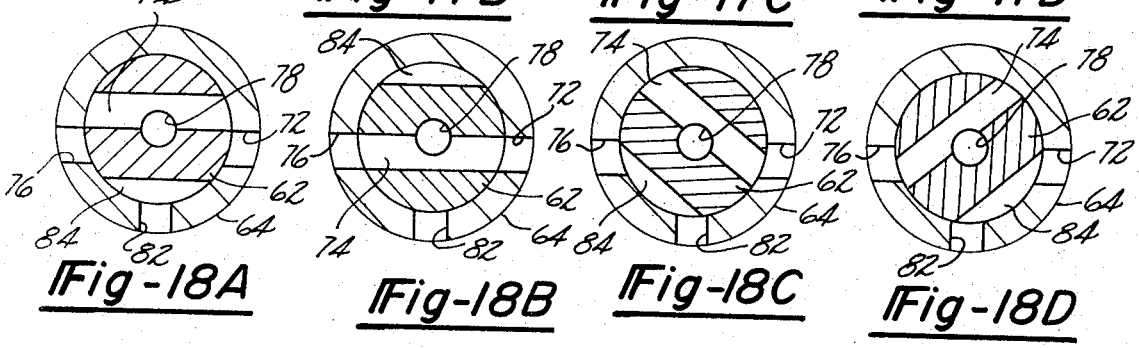
Fig-18A  Fig-18B  Fig-18C  Fig-18D

METHOD OF MAKING SPOOL VALVES

RELATIONSHIP TO OTHER PATENT APPLICATIONS

This application is a division and continuation-in-part of copending U.S. Pat. application Ser. No. 97,140 filed Dec. 11, 1970, entitled "Valve Structure and Boost Control System," now U.S. Pat. No. 3,700,004. This application is also a continuation-in-part of copending application entitled "Valve Construction," Ser. No. 230,845, filed Mar. 1, 1972 and of copending application entitled "Methods of Making Spool Valves," Ser. No. 282,964 filed Aug. 23, 1972, both now abandoned.

BACKGROUND OF THE INVENTION

I. Field of the Invention

This invention relates to methods of manufacturing spool valves for fluid control systems. Spool valves of the type dealt with herein consist essentially of a generally cylindrical sleeve member, a generally cylindrical core member rotatably mounted in said sleeve, perforations in the sleeve which serve as fluid inlet and output ports, and perforations in the core which register for fluid flow with selected sleeve perforations upon rotation of the core relative to the sleeve.

II. Description of the Prior Art

Spool valves of many types with numerous porting variations are used in all types of fluid power and fluid control systems, generally requiring specialized and difficult manufacturing processes. With requirements for more complex fluid systems, valves have tended to become more complex, thus causing increases in costs and problems of reliability. Simpler valve fabrications methods are highly to be desired.

SUMMARY OF THE INVENTION

In the manufacture of a spool valve the method of the invention is carried out with the core and sleeve of the valve being fixed against rotational or longitudinal movement relative to each other. The valve, when so fixed is in the "manufacturing" position. While the valve is in the manufacturing position a single machine operation is performed on both core and sleeve. For example, the valve is held in a drill press and a hole is drilled through one wall of the sleeve and partway into the core. The perforations, because they are formed in a single machine operation, have congruent boundaries at the interface between core and sleeve. It is an additional feature of the invention that the perforations made in the manufacturing position are offset from and parallel to a plane which includes the longitudinal axis of the core and sleeve.

The perforations may be circular, rectangular, channel shaped, or the like, and may be made by drilling, grinding, electrical discharge machining, or the like. A perforation made by a single machine operation may extend, for example, through one side of the sleeve and entirely through the core or, for example, may extend entirely through the sleeve and entirely through the core. Further, there may be groups of such perforations each group spaced longitudinally from another, each made in a single machine operation, and one coacting with another when the valve is in a functional position. The valve is changed from its manufacturing position to its functional position (a) by revolving the core to effect a change in the radial position of the core relative to the sleeve, (b) by moving the core longitudinally relative to the sleeve, (c) by reversing the core end-for-end relative to the core, or (d) by a combination of such movements.

Similarly, perforations of the type described may be made in the sleeve and core in a first manufacturing position followed by movement of the core and sleeve, longitudinally or radially, relative to each other to a second manufacturing position. Another set of perforations can then be made by a single machine operation in said second manufacturing position.

DESCRIPTION OF THE DRAWINGS

For a more complete understanding of the invention, reference may be had to the accompanying drawings illustrating preferred embodiments thereof in which like reference characters refer to like parts throughout the several views, and in which:

FIG. 1 is an exploded perspective view of a spool valve assembly made by methods embodying the invention;

FIG. 2 is a diagrammatic cross-sectional view of a spool valve assembly and tool following the making of a port-forming perforation, FIG. 3 is a diagrammatic cross-sectional view of the assembly of FIG. 2 with the core rotated 180° to its neutral operative position, FIG. 4 is a diagrammatic cross-sectional view of the spool valve assembly and tool following the making of a second, and alternative, port-forming perforation, FIG. 5 is a diagrammatic cross-sectional view of the assembly of FIG. 4 with the core rotated 180° to its neutral operative position, FIG. 6 is an exploded perspective view of a third spool valve made by a method embodying the invention, FIG. 7 is a cross-sectional view taken in the plane of lines A–B and C–D of FIG. 6 in the manufacturing position, FIG. 8 is similar to FIG. 7 but with the core rotated 180° relative to the sleeve, FIG. 9 is similar to FIG. 7 following rotation of the core member relative to the sleeve member to a second and operational position, FIG. 10 is similar to FIG. 7 following rotation of the core member relative to the sleeve member to a third and operational position, FIG. 11 is a cross-sectional view of a fourth spool valve modification in its manufacturing position and including two peripheral channels, FIG. 12 is a cross-sectional view of the spool valve of FIG. 11 following rotation of the core member relative to the sleeve member to a second and operational position, FIG. 13 is a cross-sectional view of the spool valve of FIG. 11 following rotation of the core member relative to the sleeve member to a third and operational position, FIG. 14 is a perspective view of a fifth valve and a machine tool for forming a peripheral channel, said valve being in a first manufacturing position;

FIG. 15 is a perspective view of the valve of FIG. 14 wherein the core has been rotated 180° relative to the sleeve to a second manufacturing position, FIG. 16 is an exploded perspective view of the valve of FIGS. 14 and 15 with additional perforations for a complete functional valve, FIGS. 17A, 17B, 17C, and 17D are cross-sectional views taken along the line E–F of FIG. 14 and showing, respectively, the first manufacturing position, the second manufacturing position, a first operational position, and a second operational position, FIG. 18A, 18B, 18C, and 18D are cross-sectional views taken along the line G–H of FIG. 16 and showing, respectively, the first manufacturing position, the second manufacturing position, a first operational position and a second operational position.

DESCRIPTION OF THE PREFERRED METHODS

Figure 19:
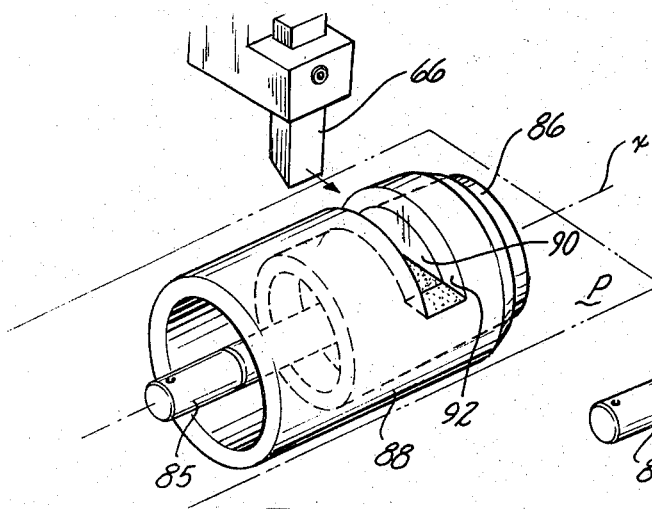
FIG. 19 is a perspective view of a sixth spool valve in a first manufacturing position.

FIG. 1 illustrates in exploded view a valve assembly 10 as comprising a cylindrical sleeve member 12 having a longitudinal bore 14 extending therethrough and adapted to closely enclose a cylindrical hollow core member 16.

The sleeve member 12 is perforated on transverse axes A and B, forming ports 18, 20, 22 and 24 as shown, while the core member 16 is perforated on axes A' and B', forming ports 26, 28, 30 and 32. It will be seen that the perforation axes A and B are longitudinally spaced and laterally offset on opposite sides and parallel to a plane P which contains the longitudinal axis X of the sleeve member 12, which axis is of course common to the longitudinal axis of the core member 16. The perforation axes A' and B' are likewise longitudinally spaced and laterally offset on opposite sides and parallel to the plane P, but, as oriented in FIG. 1, the core member 16 has been rotated 180° from its initial formed position within the sleeve member 12 so that the axes A' and B' are respectively on opposite sides of the plane from the axes A and B.

When manufactured as shown it will be seen that the core member 16 may be reversed end-for-end relative to the sleeve member 12 without problem or difference in port relationships, making assembly no problem as far as correctly orienting the components.

Also, it will be noted in this specific embodiment that the ports are all preferably tangentially adjacent the plane P such that, in the orientation shown, the sleeve ports will be closed off from the core ports, providing for the desired operation of this valve as will be described hereinafter.

If desired, the sides of the ports, or some of them, may extend through the plane P to provide an overlap in which sleeve and core ports will be open to each other a prescribed degree, or alternatively, some or all the ports may be slightly spaced from the plane P to provide for a prescribed degree of rotation of the core 16 in the sleeve 12 to either side of the 180° initial rotated position during which the ports will remain closed.

FIG. 2 shows, cross-sectionally, a sleeve member 12a enclosing a core member 16a and a tool 34a adapted to form in a single operation, a port 18a in the sleeve member 12a and ports 28a and 26a in the core member 16a, all on the common perforation axis A which is laterally offset from the plane P which contains the longitudinal axis X.

FIG. 3 shows the sleeve member 12a and core member 16a relatively rotated 180° such that the core ports 26a and 28a now lie on the perforation axis A' offset on the opposite side of the plane P from the axis A.

In use, rotation of the core member 16a clockwise from the position of FIG. 3 will variably open the port 26a to the port 18a, while the port 28a is unused.

FIG. 4 shows a sleeve member 12b enclosing a core member 16b and a tool 34b adapted to form in a single operation, ports 18b and 20b in the sleeve member 12b, and ports 28b and 26b in the core member 16b, all on the common perforation axis A which is laterally offset from the plane P which contains the longitudinal axis X.

FIG. 5 shows the sleeve member 12b and core member 16b relatively rotated 180° so that the core ports 26b and 28b now lie on the perforation axis A' offset on the opposite side of the plane P from the axis A. In use, rotation of the core member 16b clockwise will variably open the port 26b to the port 18b, and rotation counterclockwise will variably open the port 28b to the port 20b.

It will be seen that certain ports of FIG. 1 may be thus formed in an extremely simple fashion. The sleeve 12 and core 16 are fixed relative to each other in a manufacturing position (the core being rotated 180° relative to its position in FIG. 1). A single drilling operation produces the holes 18, 28, 26, and 20 and a second, and again a single drilling, operation produces holes 22, 32, 30, and 24. Therefore, on a 360° rotation from the position shown, in the direction indicated by the arrow, (FIG. 1), the valve portion will be in accord with the following schedule:

1. Ports 28 and 30 open to ports 20 and 22, then close;
2. Dwell period;
3. Ports 28 and 30 open to ports 18 and 24, and simultaneously ports 26 and 32 open to ports 20 and 22, then all close simultaneously;
4. Dwell period;
5. Ports 26 and 32 open to ports 18 and 24, then close, following which, on continued rotation, step (1) repeats with no dwell.

FIG. 1 also shows an arcuately extending or peripheral channel port 36 in the sleeve member 12, and a port 38 provided in the side of the core member 16 on the plane P, these ports being longitudinally spaced from and preferably intermediate the previously described ports which are offset from the plane P. This construction enables one to connect a fluid source to the port 36 to introduce fluid into the center of the core member 16 through the port 38, and the other sleeve ports 18, 20, 22, and 24 may be connected as desired into a fluid user system so that rotation of the core will selectively variably alternatively open various sleeve ports to fluid inside the core. Such a valve assembly has innumerable uses in fluid control systems. It will be apparent that ports 36 and 38 are not made in a single machine operation and their method of manufacture is not a part of the invention claimed herein.

Alternatively, the ports 36 and 38 could be eliminated and fluid could be introduced into the core member 16 axially, and rotation of the core 16 would selectively variably alternatively open the sleeve ports to this fluid.

It is also noted that the core member 16 may be shifted axially within the sleeve member 12 to longitudinally offset the core and sleeve ports, such that on rotation the ports will not open until the core is shifted back. Alternatively, a second set of sleeve ports could be provided, with the core member 16 shifting as desired, to permit alternative registry of its ports with either set of sleeve ports.

Further, additional ports may be similarly formed to increase the number of fluid connections, and ports may be offset relative to other planes containing the axis A but rotated relative to the plane P of FIG. 1.

FIG. 6 illustrates in exploded view another type of spool valve which utilizes the method of the invention in its manufacture. The valve is indicated generally by reference numeral 31, and comprises a core member 33 which can be rotatably mounted in a longitudinal bore 35 of a sleeve member 37.

The sleeve member 37 is perforated at 39 on an axis A–B transverse to an axis X of the core and sleeve members and offset from a plane P which includes the axis X. The perforation 39, in a first position, a manufacturing position, of the core 33 relative to the sleeve 37; registers with perforation 40 in the core member 33, the perforations 39, 40 forming a peripheral channel with congruent boundaries at the respective interface of the channel in the core member 33 and the sleeve member 37 (see FIG. 7). The peripheral channel can be made by a single shaping or grinding operation such as is described more fully in connection with FIG. 14.

The sleeve member 37 is also perforated at 42, 44 on an axis C–D transverse to axis X. The perforation 42, 44 in a first position of the core 33 relative to the sleeve 37, registers with a core perforation 46 forming a cylindrical hole with congruent boundaries at the respective interfaces of the hole in core member 33 and sleeve member 37 (see FIG. 7). The holes 42 and 44 in the sleeve 37 and the hole 46 in the core 33 are made by a single drilling operation, as by drill 34a, see (FIG. 2). An intermediate perforation 48 is made in the sleeve only in a separate machine operation.

Referring to FIGS. 7–10 inclusive, four positions of the core 33 of FIG. 6 relative to the sleeve 37 are shown. FIG. 7 illustrates the first, or manufacturing, position. It can be seen in FIG. 7 that a transverse peripheral channel can be made through the core 33 and sleeve 37 to form, by a single machine operation, the core perforation 40 and the sleeve perforation 39. Similarly, it can be seen that a transverse cylindrical or other shaped hole can be made by a single machine operation to form core perforation 46 and sleeve perforations 42, 44. A hole 48 in sleeve 37 is made in a separate machine operation.

FIG. 8 is the same as FIG. 7 except that the core 33 has been rotated 180° relative to the sleeve to a dwell, or off position of the valve.

FIG. 9 is the same as FIG. 8 except that the core 35 has been rotated clockwise to an operational position wherein the sleeve perforations 39 and 44 both register with the core perforation 46 for fluid passage therethrough. Similarly, the sleeve perforations 44 and 48 both register with the core perforation 40 for fluid passage therethrough.

FIGS. 11–13 inclusive show another modification of the valve of the invention wherein two transverse peripheral channels are formed in the valve in its manufacturing position (FIG. 11) resulting in core perforations 50 and 52 and sleeve perforations 54 and 46. The channels 50 and 54 are made in a single machine operation and the channels 52 and 56 are made in a single machine operation. Intermediate perforations 58 and 60 are made in the sleeve only by a separate machine operation. FIGS. 12 and 13 show respectively operational positions of the valve of FIG. 11 in the same manner as shown in FIGS. 9 and 10 for the valve of FIG. 7.

FIGS. 14 through 18D illustrate an embodiment of the invention in which there are two manufacturing positions of the core relative to the sleeve and wherein the two manufacturing positions are displaced radially from each other. FIG. 14 shows a spool valve wherein the position of a core 62 has been fixed relative to a sleeve 64 in the first manufacturing position. In said first manufacturing position a shaping tool 66, in a single operation, is used to form a peripheral channel 68 in sleeve 64 and a peripheral channel 70 in core 62. Channels 68 and 70 have congruent boundaries at their interface between core and sleeve and lie generally in a plane parallel to and offset from plane P which includes the axis X of the valve.

FIG. 15 shows the valve of FIG. 14 fixed in its second manufacturing position wherein the core 62 of FIG. 14 has been rotated 180° relative to sleeve 64. In the latter position a hole 72, 74, and 76 is drilled through sleeve 64 and core 62 in a single drilling operation with a drill 77. The latter hole is also in a plane offset from plane P and, further, is spaced longitudinally from peripheral channels 68 and 70.

FIG. 16 shows, in exploded view, the valve of FIGS. 14 and 15 with additional functional features such as an axial extending hole 78 in core 62, a hole 80 providing fluid connection between peripheral channel 70 and the axial hole 78, a hole 82 in sleeve 64, and a second peripheral channel 84 in core 62. In the specific embodiment illustrated perforations 78, 80, 82, and 84 are each formed in a separate machine operation and not by the method of the invention. A handle (not shown) can be secured to stem 85 for the purposes of rotating the core 62 relative to the sleeve 64.

FIGS. 17A, 17B, 17C, and 17D illustrate four positions of the core 62 relative to the sleeve 64 with the view being the cross-section of the valve taken through peripheral channels 68 and 70.

FIGS. 18A, 18B, 18C, and 18D illustrate, respectively, the same positions of the core and sleeve except that the view is of a cross-section of the valve taken through peripheral channel 84 and holes 72, 74, 76, and 82. Axial hole 78 provides fluid communication between the group of perforations shown in FIG. 17A, etc. and the group of perforations shown in FIG. 18A, etc.

Thus FIGS. 17A and 18A illustrate the respective sections in the first manufacturing position (with all manufacturing completed) and FIGS. 17B and 18B illustrate the respective sections in the second manufacturing position. FIGS. 17C and 18C illustrate a third and operational position in which a first fluid stream enters channel 68, passes through channel 70, axial hole 78, hole 74, and discharges through sleeve port 72 while a second fluid stream enters sleeve port 76, passes through peripheral channel 84, and discharges through sleeve port 82. FIGS. 17D and 18D illustrate a fourth and operational position in which a second fluid stream enters channel 68, passes through channel 70, hole 80, axial hole 78, hole 74, and discharges through sleeve port 76 while a second fluid stream sleeve port 72, passes through peripheral channel 84, and discharges through sleeve port 82.

FIGS. 19 through 22 illustrate an embodiment of the invention wherein there are two manufacturing positions spaced longitudinally from each other.

FIG. 19 illustrates a first manufacturing position in which the position of the core 86 is secured against rotational or longitudinal movement relative to sleeve 88 while, in a single machine operation such as by shaping tool 66 (FIG. 14), peripheral channels 90 and 92 are made in core 86 and sleeve 88 respectively.

Figure 20:
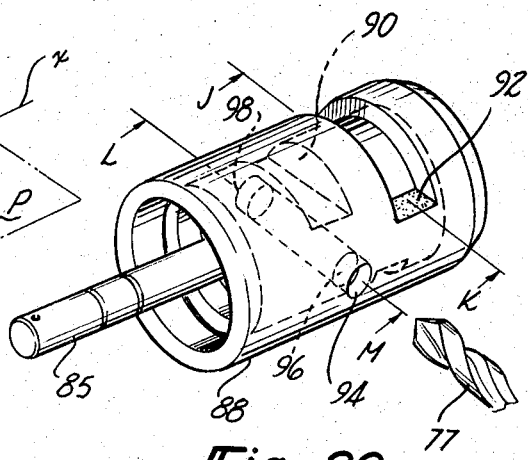
FIG. 20 is a perspective view of the valve of FIG. 19 in a second manufacturing position wherein the core of FIG. 19 has been moved longitudinally relative to the sleeve.

FIG. 20 illustrates a second manufacturing position wherein the core 86 of FIG. 19 has been moved longitudinally to the left (as shown). In the latter position hole 94, 96, and 98 is drilled, in a single machine operation with drill 77, completely through the core 86 and the sleeve 88. Auxiliary perforations such as axial hole 100, (FIG. 21A) hole 102 joining channel 92 and axial hole 100, (FIG. 21B) and hole 104; (FIG. 22) are formed in separate machine operations.

Figure 21A:
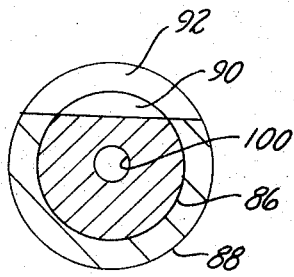
FIGS. 21A and 21B are cross-sectional views taken along the line J–K of FIG. 20 and showing, respectively, the first manufacturing position and the second manufacturing position of the valve of FIG. 20, an FIG. 22 is a cross-sectional view taken along the line L–M of FIG. 20 and shows the second manufacturing position of the valve of FIG. 20.
Figure 21B:
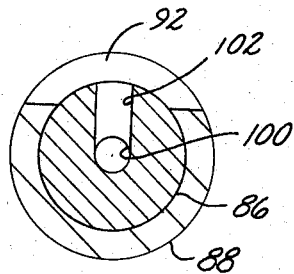
Figure 22:
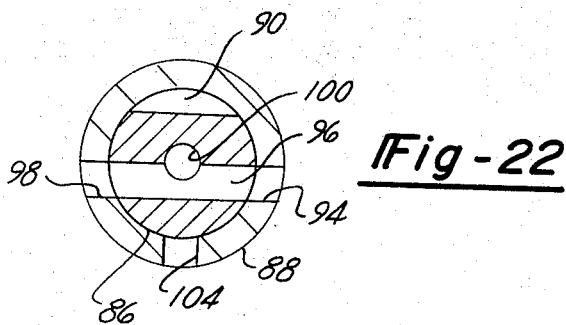

FIG. 21A illustrates the position of core 86 relative to sleeve 88 in the first manufacturing position of the valve of FIG. 19 by a cross-sectional view taken through the channels 90 and 92. FIGS. 21B and 22 show the position of core 86 relative to sleeve 88 in the second manufacturing position by, respectively, cross-sectional views taken through section J–K and section L–M of FIG. 20. Axial hole 100 provides fluid connection between the group of perforations shown in FIG. 21B and the group of perforations shown in FIG. 22.

The operational positions of the valve shown in FIGS. 19 through 22 is the same as that already shown in FIGS. 17C, 17D, 18C, and 18D.

The various perforations formed by the method of the invention in the core and sleeve members of spool valves may be formed in a number of different positions other than those illustrated. In general, at least one perforation in the core is disposed to be aligned with at least one perforation in the sleeve with such perforations being parallel to and offset from a plane which includes the axis of the core and sleeve.

Various shaped perforations may be formed by the methods of the present invention. Rectangular or square ports may sometimes be desirable where surging of the fluid is desirable. Round ports, on the other hand, minimizes surging.

The materials of which the core and sleeve members are formed may include metal, plastic, synthetic materials or any other suitable material dependent upon the particular application involved and the properties of the fluid passing through the valve.

When metal is the material involved, methods involving EDM and ECM machining are especially suitable. Such a method is desirable because of its adaptability to the wide variations generally necessary to satisfy valve porting requirement. EDM and ECM machining methods are well known to those skilled in the art. Such methods involve placing an electrode and the part to be machined in a suitable conductive solution. A voltage is applied across the electrode, which may be considered an anode, and the part to be machined, which may be considered a cathode. The electrode is shaped to the shape of the portion of the part to be eroded to provide the desired opening or openings in the core and spool.

One preferred method in practicing the present invention involves using epoxy or other suitable adhesive to hold the sleeve and core blanks together temporarily during a machine operation in a manufacturing portion. After machining the members by EDM or other machine methods, the members may be immersed in hot water, for example, to melt the epoxy or other adhesive; thus permitting the parts to be separated, cleaned, lubricated, and then assembled in appropriate housings (not shown) for operational use as hereinbefore described. Such a method may be performed relatively inexpensively with high precision of the ports formed congruently in the members.

In the present methods discussed, it is apparent that a plurality of groups of perforations may be simultaneously formed in the core and sleeve. For example, a grinding tool may make a peripheral channel in core and sleeve while a drill is making a hole through core and sleeve in the same manufacturing position.

The type of method used to form the various perforations in the sleeve and core depends to some extent upon the quantity of valves to be formed, the material of which the parts forming the valves are to be made, and other factors. For example, the setup for an EDM method may be relatively expensive for simple shapes involving only a small number of parts, while being justified when more complex perforation shapes are involved.

Depending upon the design and quantities involved, in addition to EDM, the methods involved may involve drilling, broaching, jig boring, grinding or milling. The final precision may involve additional sizing with suitable lapping or honing operations as may be required.

It will be apparent to one skilled in the art to which the invention pertains that various changes and modifications may be made therein without departing from the spirit of the invention or the scope of the appended claims.

What I claim is:

1. A method of making a spool valve structure having a cylindrical core member rotatably enclosed in a sleeve member, said method comprising the step of forming in a single machine operation a first perforation entirely through both of said members on a transverse axis parallel to and offset to one side of a plane containing the longitudinal axes of said 2. The method according to claim 1 wherein said members are retained against movement relative to each other during said forming operation.

3. The method according to claim 2 and including the step of forming a second perforation as therein defined, said two perforations being spaced radially from each other.

4. The method according to claim 2 and including the step of forming a second perforation as therein defined, said two perforations being spaced longitudinally from each other.

5. The method according to claim 3 and including forming said first and second perforation on axes offset from opposite sides of said plane.

6. The method according to claim 4 and including forming said first and second perforation on axes offset from opposite sides of said plane.

7. The method according to claim 4 and including the step of forming an axially extending hole in said core member to effect fluid connection between said first and second perforations.

8. The method according to claim 2 wherein said perforation is in the form of a peripheral channel with congruent boundaries at the interface of said core and sleeve members.

9. The method according to claim 8 wherein a second peripheral channel is formed in said core.

10. The method according to claim 2 wherein said perforation is a generally cylindrical hole with congruent boundaries at the interface of said core and sleeve members.

11. The method according to claim 4 wherein said first perforation is a peripheral channel and said second perforation is a cylindrical hole.

12. The method according to claim 4 wherein both said perforations are peripheral channels.

13. The method according to claim 1 and including forming a second perforation in said sleeve member intermediate said two ports.

14. The method according to claim 2 in which said forming operation is electrical discharge machining.

15. The method according to claim 2 wherein the step of retaining said core and sleeve members against movement comprises applying an adhesive material to said members prior to said forming operation and removing said adhesive material subsequent to said forming operation.

16. The method according to claim 14 and including using a meltable epoxy material to retain said sleeve and core member against movement.

17. The method according to claim 15 and including the steps of using electrical discharge machining and then melting said epoxy material to permit said core and sleeve members to be separated from each other following the perforation forming step.

* * * * *

UNITED STATES PATENT OFFICE
CERTIFICATE OF CORRECTION

Patent No. 3,833,988         Dated 9-10-74

Inventor(s) John D. Tobias

It is certified that error appears in the above-identified patent and that said Letters Patent are hereby corrected as shown below:

Col. 3, line 23, "an" should be --and--.

Col. 8, line 56, after "said" insert --members--.

Signed and sealed this 19th day of November 1974.

(SEAL)
Attest:

McCOY M. GIBSON JR.
Attesting Officer

C. MARSHALL DANN
Commissioner of Patents